(12) United States Patent
Hirata et al.

(10) Patent No.: US 12,497,096 B2
(45) Date of Patent: Dec. 16, 2025

(54) STEERING REACTION FORCE CONTROL DEVICE, STEERING REACTION FORCE CONTROL METHOD, AND STEERING REACTION FORCE CONTROL SYSTEM

(71) Applicant: HITACHI ASTEMO, LTD., Hitachinaka (JP)

(72) Inventors: Atsushi Hirata, Hitachinaka (JP); Yasuhito Nakakuki, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 97 days.

(21) Appl. No.: 18/685,835

(22) PCT Filed: Jul. 8, 2022

(86) PCT No.: PCT/JP2022/027141
§ 371 (c)(1),
(2) Date: Feb. 22, 2024

(87) PCT Pub. No.: WO2023/042532
PCT Pub. Date: Mar. 23, 2023

(65) Prior Publication Data
US 2024/0367712 A1 Nov. 7, 2024

(30) Foreign Application Priority Data
Sep. 14, 2021 (JP) .................. 2021-149281

(51) Int. Cl.
*B62D 5/04* (2006.01)
*B62D 5/00* (2006.01)
*B62D 6/00* (2006.01)

(52) U.S. Cl.
CPC ........... *B62D 5/0466* (2013.01); *B62D 5/006* (2013.01); *B62D 6/008* (2013.01)

(58) Field of Classification Search
CPC ....... B62D 5/0466; B62D 5/006; B62D 6/008
(Continued)

(56) References Cited

U.S. PATENT DOCUMENTS

| 2008/0230300 A1 | 9/2008 | Hara et al. |
| 2015/0274206 A1 | 10/2015 | Takeda |
| 2020/0361530 A1 | 11/2020 | Polmans et al. |

FOREIGN PATENT DOCUMENTS

| JP | 2006-159963 A | 6/2006 | |
| JP | 4293734 B2 * | 7/2009 | ............ B62D 6/008 |
| JP | 2014-080179 A | 5/2014 | |

OTHER PUBLICATIONS

International Preliminary Report on Patentability dated Mar. 28, 2024 issued in International Application No. PCT/JP2022/027141, with English translation, 14 pages.

(Continued)

*Primary Examiner* — Hai H Huynh
(74) *Attorney, Agent, or Firm* — FOLEY & LARDNER LLP (57) ABSTRACT

A steering reaction force control device, a steering reaction force control method, and a steering reaction force control system according to the present invention determine an amount of torque of a steering reaction force imparted by the reaction force actuator and a direction of torque for returning the steering operation input member to a neutral position from a physical quantity related to a vehicle speed of the vehicle and a physical quantity related to the operation information of the steering operation input member, and output a control signal based on the amount of torque and the direction of torque to the reaction force actuator. As a result, it is possible to prevent the hunting of the operating position of the steering operation input member when the steering operation input member is retained in a given steering position.

11 Claims, 8 Drawing Sheets

(58) Field of Classification Search
USPC .................................. 701/41, 42, 43, 44
See application file for complete search history.

(56) References Cited

OTHER PUBLICATIONS

International Search Report dated Sep. 20, 2022 issued in International Application No. PCT/JP2022/027141, 7 pages.

* cited by examiner

STEERING REACTION FORCE CONTROL DEVICE, STEERING REACTION FORCE CONTROL METHOD, AND STEERING REACTION FORCE CONTROL SYSTEM

TECHNICAL FIELD

The present invention relates to a steering reaction force control device, to a steering reaction force control method, and to a steering reaction force control system.

BACKGROUND ART

A steering device for a vehicle disclosed in Patent Document 1 is a steer-by-wire steering device, in which a steering wheel that receives steering input is not mechanically connected to a steering mechanism that steers steered road wheels, and the steering reaction force according to the road reaction force is added to the steering wheel. When the steering wheel is turned back, the feedback gain of the steering reaction force corresponding to the road surface reaction force is made smaller than when additional turning of the steering wheel is performed.

REFERENCE DOCUMENT LIST

Patent Document

Patent Document 1: JP 2006-159963 A

SUMMARY OF THE INVENTION

Problem to Be Solved by the Invention

In the case of steer-by-wire in which the steering wheel as a steering operation input member is not mechanically connected to a steering mechanism that changes the orientation of tires, frictional torque added to the steering wheel, in other words, the frictional resistance, is less than the case in which the steering wheel is mechanically connected to the steering mechanism.

For this reason, it is difficult for a driver to retain steering to hold the steering wheel in the turned state, and because unstable fluctuations in the operation angle of the steering wheel change the steering reaction force, so-called hunting may occur to the operation angle of the steering wheel, and the driver's sensations of steering may be degraded.

The present invention has been made in view of such conventional circumstances, and an object of the present invention is to provide a steering reaction force control device, a steering reaction force control method, and a steering reaction force control system that can prevent the hunting of the operating position of a steering operation input member when a steering position is to be retained.

Means for Solving the Problem

According to one aspect of the present invention, the amount of torque of the steering reaction force imparted by the reaction force actuator is determined from the physical quantity related to the vehicle speed of the vehicle and the physical quantity related to the operation information of the steering operation input member, a present value of the physical quantity related to the operation information of the steering operation input member and a previous value earlier than the present value by a predetermined time are acquired, the previous value is compared with the present value to determine a change in the operation information, a direction of torque for returning the steering operation input member to a neutral position is determined from an operation history of the steering operation input member based on the change in the operation information, and a control signal based on the amount of torque and the direction of torque is output to the reaction force actuator.

Effects of the Invention

According to the present invention, it is possible to prevent the hunting of the operating position of the steering operation input member when steering position is retained.

MODE FOR CARRYING OUT THE INVENTION

Hereinafter, an embodiment of a steering reaction force control device, a steering reaction force control method, and a steering reaction force control system according to the present invention will be described with reference to the drawings.

Figure 1:
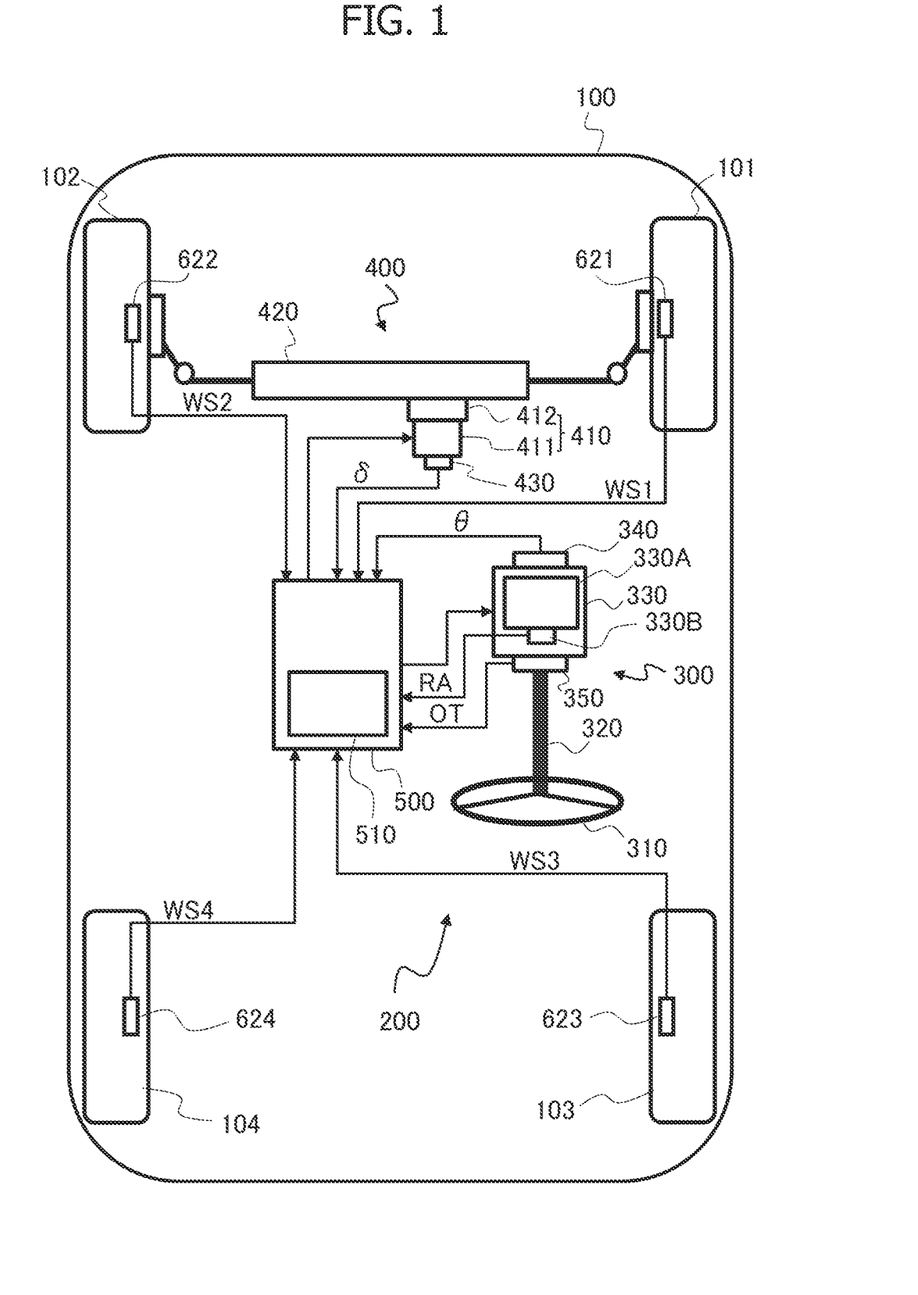
FIG. 1 is a configuration diagram of a steer-by-wire type steering system.

FIG. 1 is a system configuration diagram showing an example of a steering system 200 mounted in a vehicle 100.

Steering system 200 is a steer-by-wire type steering device in which a steering mechanism that steers front wheels 101, 102, which are steered road wheels, are mechanically separated from a steering wheel 310 that serves as a steering operation input member.

Steering system 200 has a steering input device 300 that includes steering wheel 310, a steering device 400 that includes the steering mechanism, and a control device 500 that controls an actuator of steering input device 300 and an actuator of steering device 400.

Steering input device 300 includes steering wheel 310, a steering shaft 320, a reaction force actuator 330, an operation angle sensor 340, and an operation torque sensor 350.

Steering shaft 320 rotates as steering wheel 310 is rotated, but is mechanically separated from front wheels 101, 102.

Reaction force actuator 330 is a device that imparts a steering reaction force to steering wheel 310 by means of a motor 330A or the like, and in addition to the motor, includes a torque damper, an operation angle limiting mechanism, a speed reducer and the like.

The difference between an operation torque generated by a driver of vehicle 100 operating steering of steering wheel 310 and a steering reaction force torque generated by reaction force actuator 330 causes steering input device 300 to rotate steering wheel 310.

Operation angle sensor 340 is an operation information detector that detects operation angle θ [deg] of steering wheel 310, in which operation angle θ is a physical quantity related to the operation information of steering wheel 310.

Here, operation angle θ of steering wheel 310 is the operating position of the steering operation input member, and operation angle sensor 340 is the operating position detector that detects the operating position of the steering operation input member.

Operation angle sensor 340, for example, detects operation angle θ as an angle of zero when steering wheel 310 is at the neutral position (in other words, the straight-ahead position), and detects operation angle θ in the right direction from the neutral position as a positive angle and operation angle θ in the left direction from the neutral position as a negative angle.

Furthermore, motor 330A includes a motor rotation angle sensor 330B that detects rotational position RA of the output shaft. That is, motor rotation angle sensor 330B is the active position detector that detects the active position of reaction force actuator 330.

Here, by using the neutral position of steering wheel 310 detected by operation angle sensor 340 as a standard, control device 500 can detect operation angle θ of steering wheel 310 based on information on the motor rotation angle detected by motor rotation angle sensor 330B.

Furthermore, operation torque sensor 350 is provided on steering wheel 310, and serves as the operating torque detector that detects information on operation torque OT of steering wheel 310.

Steering device 400 includes a steering actuator 410, a steering member 420, and a steering angle sensor 430, in which steering actuator 410 has a motor 411, a speed reducer 412 and the like, steering member 420 has a conversion mechanism such as a rack and pinion that converts a rotational motion of motor 411 into a linear motion, and steering angle sensor 430 detects steering angle δ of front wheels 101, 102 (in other words, the turning angle of the front tires) from the active position of steering actuator 410.

Steering member 420 may also be referred to as the steering mechanism.

Steering angle δ of front wheels 101, 102 is also referred to as the turning angle of the front tires.

Steering actuator 410 steers front wheels 101, 102 via steering member 420, and steering angle sensor 430 detects steering angle δ [deg] that corresponds to the steering amount of steering member 420.

The steering amount of steering member 420 is, for example, the axial position of a rack bar.

Steering angle sensor 430 detects the rotation angle of the output shaft of motor 411, which constitutes steering actuator 410, as the physical quantity correlated to steering angle δ.

Road wheel speed sensors 621-624 are also included in vehicle 100, and are adopted to detect road wheel speeds WS1-WS4 that are respectively indicating the rotation speeds of road wheels 101-104.

Control device 500 is an electronic control device including a microcomputer 510 as the main component, and microcomputer 510 includes an MPU (Microprocessor Unit), a ROM (Read Only Memory), and a RAM (Random Access Memory).

Control device 500 acquires detection signals output from operation angle sensor 340, motor rotation angle sensor 330B, steering angle sensor 430, and road wheel speed sensors 621-624, respectively.

Control device 500 then computes vehicle speed V [km/h] of vehicle 100 based on information on respective road wheel speeds WS1-WS4 of road wheels 101-104 that are output from road wheel speed sensors 621-624, in other words, the physical quantity related to vehicle speed V of vehicle 100.

Furthermore, microcomputer 510 of control device 500 determines the target value of the amount of steering reaction force torque Ts and the target value of steering angle δ through a calculation process based on information on operation angle θ, steering angle δ, vehicle speed V, and the like.

Microcomputer 510 of control device 500 then outputs a command signal of the amount of steering reaction force torque Ts, in other words, a control signal of reaction force actuator 330, to reaction force actuator 330 so as to control the amount of steering reaction force torque Ts to be imparted to steering wheel 310.

Furthermore, microcomputer 510 of control device 500 outputs a command signal of steering angle δ, in other words, a control signal of steering actuator 410, to steering actuator 410 so as to control steering angle δ of front wheels 101, 102, that is, the tire angle.

Thus, microcomputer 510 of control device 500 is the control unit of reaction force actuator 330 that outputs a control signal to reaction force actuator 330.

Microcomputer 510 follows each step in the steering reaction force control program to execute the steering reaction force control method so that control device 500 functions as the steering reaction force control device.

Furthermore, the steering reaction force control system includes steering wheel 310, reaction force actuator 330, road wheel speed sensors 621-624 serving as vehicle speed detectors, operation angle sensor 340, motor rotation angle sensor 330B, and control device 500.

Note that steering system 200 may separately include a first microcomputer that controls steering actuator 410 or a first control device that has the first microcomputer, and a second microcomputer that controls reaction force actuator 330 or the second control device that has the second microcomputer.

Hereinafter, control of the steering reaction force performed by control device 500 will be described in detail.

Figure 2:
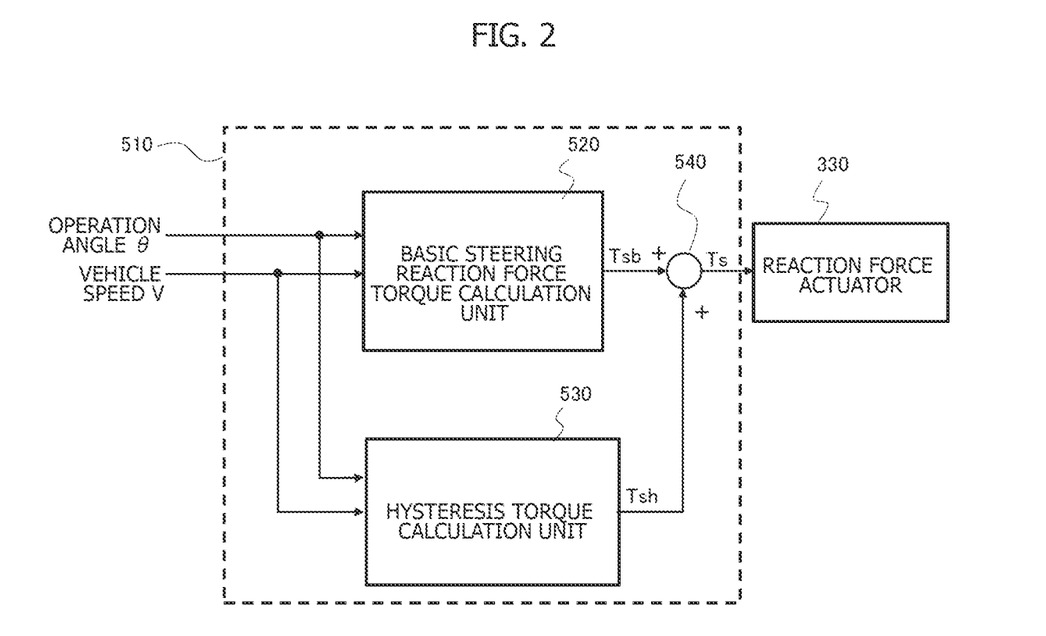
FIG. 2 is a block diagram showing a functional unit that calculates a steering reaction force torque.

FIG. 2 is a block diagram showing the function of controlling steering reaction force in microcomputer 510 of control device 500.

Microcomputer 510 acquires a signal of operation angle θ of steering wheel 310 that is determined by operation angle sensor 340 and a signal of vehicle speed V of vehicle 100, determines the amount of torque and direction of torque of the steering reaction force from these signals, and outputs the control signal based on the determined amount of torque and direction of torque to reaction force actuator 330.

Microcomputer 510 may acquire a signal of operation angle θ of steering wheel 310 that is determined by operating angle sensor 340 and motor rotation angle sensor 330B.

Here, microcomputer 510 has functional units, which are a basic steering reaction force torque calculation unit 520, a hysteresis torque calculation unit 530, and an adder unit 540.

Basic steering reaction force torque calculation unit 520 calculates an amount of basic steering reaction force torque Tsb based on a signal of vehicle speed V and a signal of operation angle θ of steering wheel 310.

Hysteresis torque calculation unit 530 calculates an amount of hysteresis torque Tsh based on a signal of vehicle speed V and a signal of operation angle θ of steering wheel 310.

Note that in the present embodiment, the direction of torque of steering reaction force is either a direction of torque applied in a direction to rotate steering wheel 310 to the right or to the left, and the sign of the amount of torque indicates the direction of torque.

Adder unit 540 adds the signal of the amount of basic steering reaction force torque Tsb output from basic steering reaction force torque calculation unit 520 and the signal of the amount of hysteresis torque Tsh output from hysteresis torque calculation unit 530 to determine the final amount of steering reaction force torque Ts (Ts=Tsb+Tsh).

Adder unit 540 then outputs a command signal of the amount of steering reaction force torque Ts to reaction force actuator 330.

Figure 3:
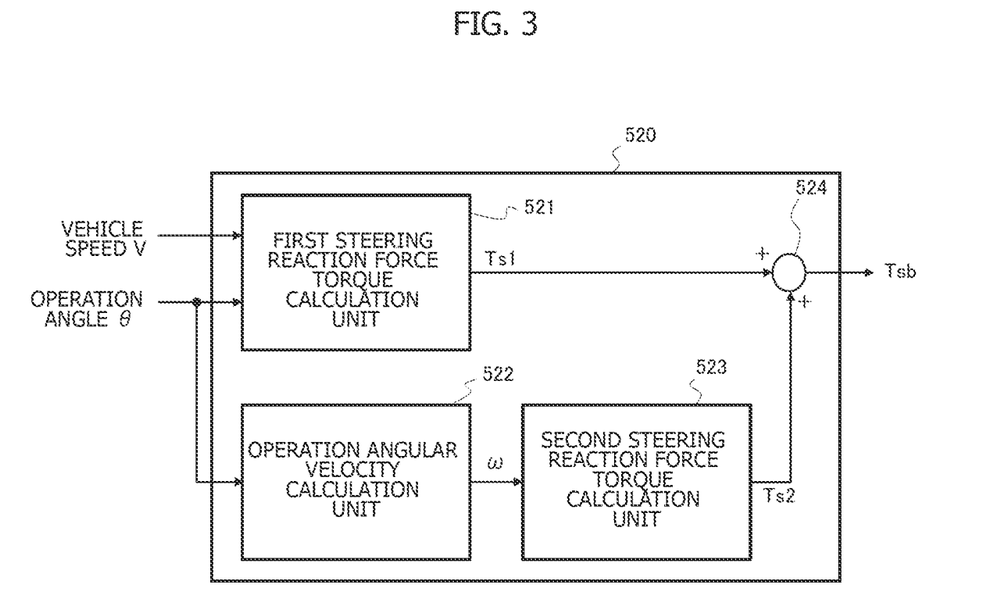
FIG. 3 is a block diagram showing a functional unit that calculates a basic steering reaction force torque.

FIG. 3 is a block diagram showing details of basic steering reaction force torque calculation unit 520.

Basic steering reaction force torque calculation unit 520 includes a first steering reaction force torque calculation unit 521, an operation angular velocity calculation unit 522, a second steering reaction force torque calculation unit 523, and an adder unit 524.

Based on the signal of operation angle θ, first steering reaction force torque calculation unit 521 calculates an amount of first steering reaction force torque Ts1 for returning steering wheel 310 to the neutral position.

The amount of first steering reaction force torque Ts1 is also referred to as the amount of steering reaction force torque that simulates self-aligning torque.

Figure 4:
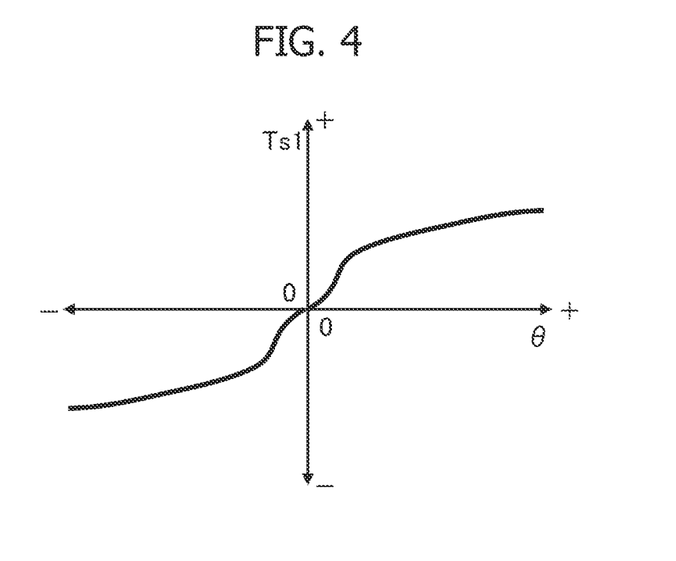
FIG. 4 is a line graph showing a correlation between an amount of first steering reaction force torque Ts1 and operation angle θ.

FIG. 4 is a line graph showing an example of the correlation between operation angle θ and the amount of first steering reaction force torque Ts1, in which the vertical axis shows the amount of first steering reaction force torque Ts1, and the horizontal axis shows operation angle θ.

First steering reaction force torque calculation unit 521 sets the amount of first steering reaction force torque Ts1 in the direction of returning steering wheel 310 to the neutral position so that the absolute value of the amount of torque gradually increases as the absolute value of operation angle θ increases.

Here, the amount of first steering reaction force torque Ts1 in the direction of returning steering wheel 310 to the neutral position is the amount of first steering reaction force torque Ts1 of the sign in the direction of returning steering wheel 310 to the neutral position.

Furthermore, first steering reaction force torque calculation unit 521 sets the gain in the absolute value of the amount of first steering reaction force torque Ts1 with respect to the absolute value of operation angle θ to be a smaller value as vehicle speed V decreases.

As a result, first steering reaction force torque calculation unit 521 sets the amount of first steering reaction force torque Ts1 to be a greater absolute value as the absolute value of operation angle θ of steering wheel 310 increases, and further, to be a smaller absolute value as vehicle speed V decreases when the absolute value of operation angle θ of steering wheel 310 is the same.

Operation angular velocity calculation unit 522 determines operation angular velocity ω [deg/s] from the signal of operation angle θ [deg].

Operation angular velocity calculation unit 522 then outputs the signal of operation angular velocity ω to second steering reaction force torque calculation unit 523.

Second steering reaction force torque calculation unit 523 calculates an amount of second steering reaction force torque Ts2 that simulates a viscous component acting on steering wheel 310 based on the signal of operation angular velocity ω.

Figure 5:
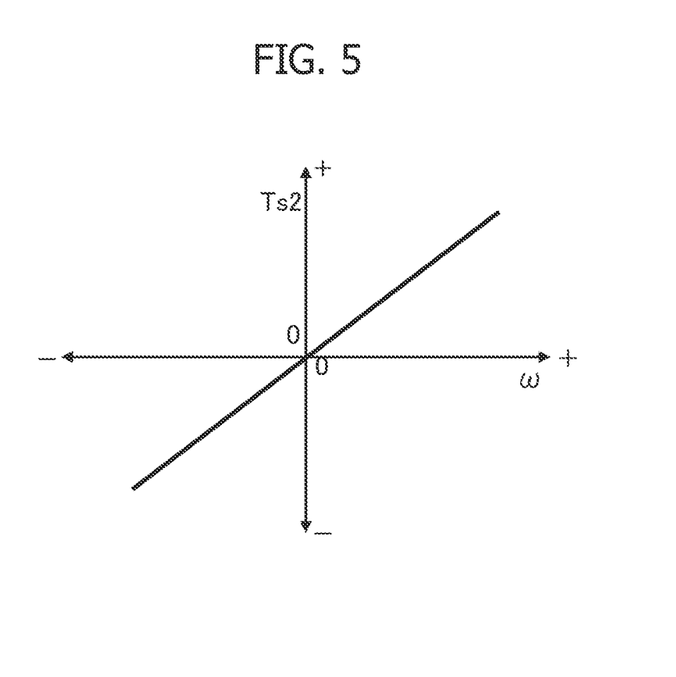
FIG. 5 is a line graph showing a correlation between an amount of second steering reaction force torque Ts2 and operation angular velocity ω.

FIG. 5 is a line graph showing an example of the correlation between operation angular velocity ω and the amount of second steering reaction force torque Ts2, in which the vertical axis shows the amount of second steering reaction force torque Ts2, and the horizontal axis shows operation angular velocity ω.

Second steering reaction force torque calculation unit 523 sets the amount of second steering reaction force torque Ts2, which is in the opposite direction to the operation direction of steering wheel 310, so that the absolute value of the amount of torque gradually increases as the absolute value of operation angular velocity ω increases.

Adder unit 524 acquires the signal of the amount of first steering reaction force torque Ts1 and the signal of the amount of second steering reaction force torque Ts2, and adds the amount of first steering reaction force torque Ts1 and the amount of second steering reaction force torque Ts2 to output a signal of the amount of basic steering reaction force torque Tsb (Tsb=Ts1+Ts2).

Figure 6:
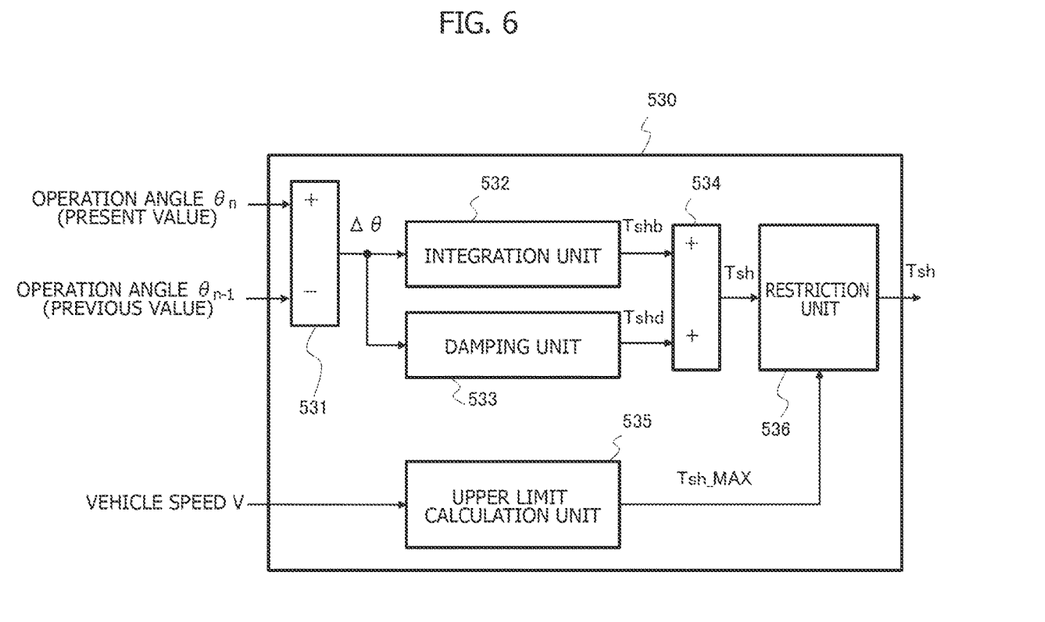
FIG. 6 is a block diagram showing a functional unit that calculates an amount of hysteresis torque.

FIG. 6 is a block diagram showing details of hysteresis torque calculation unit 530.

The amount of hysteresis torque Tsh calculated by hysteresis torque calculation unit 530 is a steering reaction force torque component for giving sensations of friction to the driver when steering wheel 310 is operated, that is, a steering reaction force torque component that simulates the frictional resistance added to steering wheel 310.

Hysteresis torque calculation unit 530 has an operation deviation calculation unit 531, an integration unit 532, a damping unit 533, an adder unit 534, an upper limit calculation unit 535, and a restriction unit 536.

Operation deviation calculation unit 531 acquires the present value of the physical quantity related to the operation information of steering wheel 310 and the previous value that is earlier than the present value by a predetermined time, and compares the present value with the previous value to calculate the operation deviation, which is a deviation of the operation information.

The deviation of operation information is also referred to as the variation of operation information per predetermined time.

According to an aspect of operation deviation calculation unit 531, signals of present value $\theta_n$ and previous value $\theta_{n-1}$ of operation angle θ detected by operation angle sensor 340 are acquired as the physical quantity related to the operation information.

Operation deviation calculation unit 531 then subtracts previous value $\theta_{n-1}$ of operation angle θ from present value $\theta_n$ of operation angle θ to determine variation Δθ of operation angle θ, and outputs a signal of variation Δθ of operation angle θ as a signal of the operation deviation.

Integration unit 532 acquires a signal of variation Δθ of operation angle θ that is determined by operation deviation calculation unit 531, and integrates variation Δθ.

Starting from the neutral position of steering wheel 310, in other words, upon resetting the integral to zero at the neutral position, integration unit 532 integrates the signal of variation Δθ.

Integration unit 532 then multiplies the integral of variation Δθ by the gain to determine an amount of reference hysteresis torque Tshb, which is in the direction of returning steering wheel 310 to the neutral position.

Here, as a result of integration of variation Δθ that starts from the neutral position of steering wheel 310, the sign of the integral of variation Δθ indicates the operation direction from the neutral position of steering wheel 310, and thus, the absolute value of integral of variation Δθ correlates to the displacement of steering wheel 310 from the neutral position.

Furthermore, by multiplying the integral of variation Δθ by the gain, integration unit 532 sets the amount of reference hysteresis torque Tshb so that the absolute value of the amount of torque gradually increases as the absolute value of the integral of variation Δθ increases.

That is, integration unit 532 compares the previous value with the present value of operation information to determine the deviation of operation information, and determines the direction of torque of reference hysteresis torque from the operation history of steering wheel 310 based on the deviation of operation information.

In other words, integration unit 532 determines the direction of torque of reference hysteresis torque from the integral of the deviation of operation information.

Damping unit 533 acquires the signal of variation Δθ determined by operation deviation calculation unit 531, and based on variation Δθ, calculates the amount of damping torque Tshd as a damping component.

By multiplying variation Δθ by the gain, damping unit 533 sets the amount of damping torque Tshd, which is in the opposite direction to the operation direction of steering wheel 310 indicated by the sign of variation Δθ, so that the absolute value of the amount of torque gradually increases as the absolute value of variation Δθ increases.

In other words, in regard to the amount of damping torque Tshd, the direction of suppressing a change in operation angle θ, which is the operation information of steering wheel 310, is the direction of torque.

Adder unit 534 acquires the signal of the amount of reference hysteresis torque Tshb and the signal of the amount of damping torque Tshd, and adds the amount of reference hysteresis torque Tshb and the amount of damping torque Tshd to output a signal of the amount of hysteresis torque Tsh (Tsh=Tshb+Tshd).

That is, the amount of hysteresis torque Tsh is a steering reaction force component for returning steering wheel 310 to the neutral position, and includes the amount of damping torque Tshd.

On the other hand, upper limit calculation unit 535 acquires the signal of vehicle speed V, and based on vehicle speed V, determines upper limit value Tsh_MAX of the absolute value of the amount of hysteresis torque Tsh.

Figure 7:
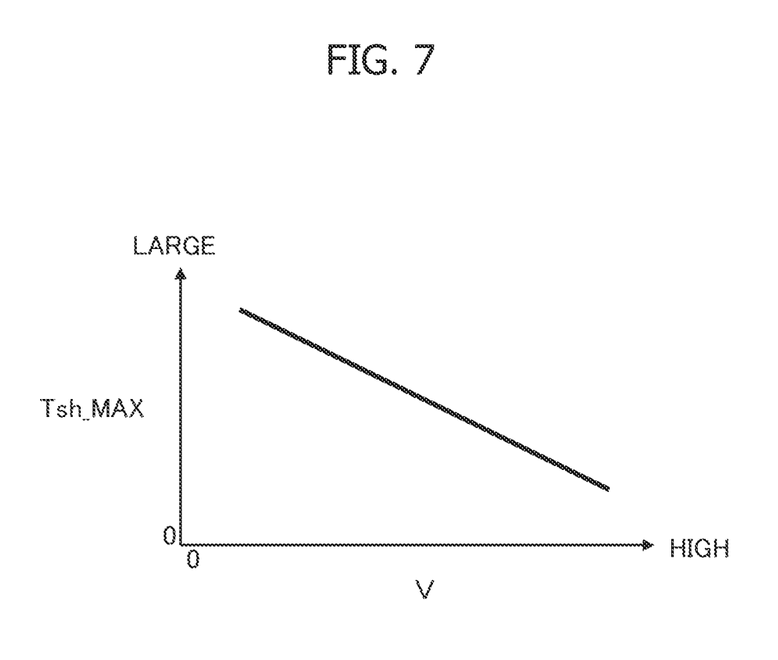
FIG. 7 is a line graph showing a correlation between upper limit value Tsh_MAX and vehicle speed V.

FIG. 7 is a line graph showing an example of the correlation between vehicle speed V and upper limit value Tsh_MAX in upper limit calculation unit 535, in which the vertical axis shows upper limit value Tsh_MAX and the horizontal axis shows vehicle speed V.

Upper limit value calculation unit 535 sets upper limit value Tsh_MAX to be a smaller value as vehicle speed V increases so that the absolute value of the amount of hysteresis torque Tsh is restricted to a smaller value as vehicle speed V increases.

Restriction unit 536 acquires the signal of the amount of hysteresis torque Tsh output by adder unit 534 and the signal of upper limit value Tsh_MAX calculated by upper limit value calculation unit 535.

If the absolute value of the amount of hysteresis torque Tsh output from adder unit 534 is greater than upper limit value Tsh_MAX, restriction unit 536 employs the same sign as the amount of hysteresis torque Tsh that is output from adder unit 534, in other words, the same direction of torque, to output a signal of the amount of hysteresis torque Tsh in which the amount of torque is upper limit value Tsh_MAX.

On the other hand, when the absolute value of the amount of hysteresis torque Tsh output from adder unit 534 is less than or equal to upper limit value Tsh_MAX, restriction unit 536 outputs the signal of the amount of hysteresis torque Tsh output from adder unit 534 as it is without processing it.

That is, restriction unit 536 restricts the absolute value of the amount of hysteresis torque Tsh so as not to exceed upper limit value Tsh_MAX according to vehicle speed V.

Adder unit 540 in FIG. 2 acquires the signal of the amount of hysteresis torque Tsh output from restriction unit 536 of hysteresis torque calculation unit 530, and adds the signal of the amount of basic steering reaction force torque Tsb and the signal of the amount of hysteresis torque Tsh to determine the amount of steering reaction force torque Ts (Ts=Tsb+Tsh).

Adder unit 540 then outputs a command signal of the amount of steering reaction force torque Ts to reaction force actuator 330.

That is, the amount of steering reaction force torque Ts includes the amount of first steering reaction force torque Ts1, which is a restoring component, the amount of second steering reaction force torque Ts2, which is a viscous component, and the amount of hysteresis torque Tsh, which is a friction component.

Figure 8:
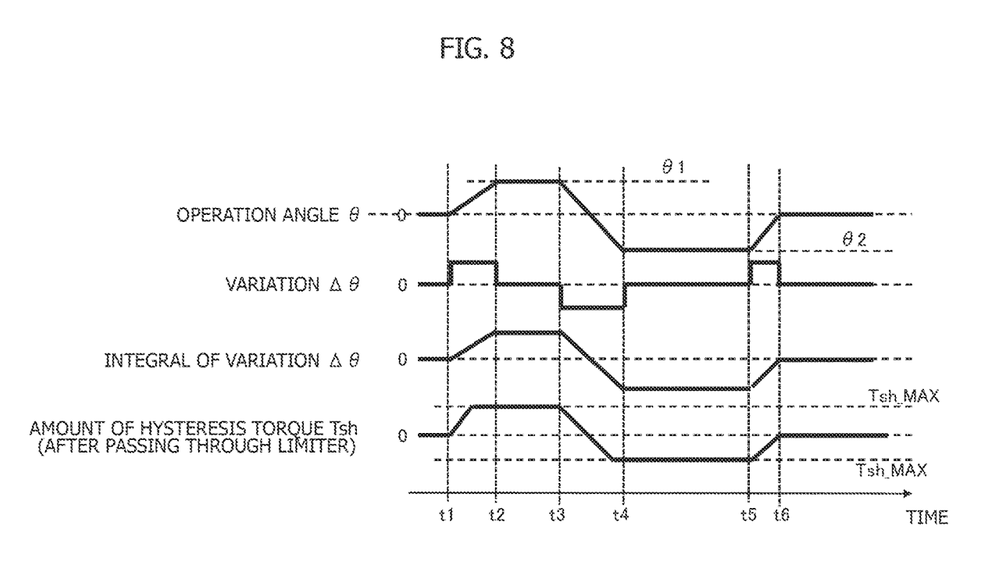
FIG. 8 is a time chart illustrating correlations among operation angle θ, variation Δθ, an integral of variation Δθ, and an amount of hysteresis torque Tsh.

FIG. 8 is a time chart illustrating correlations among operation angle θ, variation Δθ, the integral of variation Δθ, and the amount of hysteresis torque Tsh after passing through restriction unit 536.

In FIG. 8, steering wheel 310 is first maintained in the neutral position, and then operated toward one direction at a constant speed from time t1. When steering wheel 310 reaches a first predetermined angle θ1 (θ1>0) at time t2, steering wheel 310 is maintained at first predetermined angle θ1 between t2 and time t3.

Steering wheel 310 is then operated toward the neutral position at a constant speed from time t3. When steering wheel 310 reaches a second predetermined angle θ2 (θ2<0), which is the opposite side beyond the neutral position, at time t4, steering wheel 310 is maintained at second predetermined angle θ2 between time t4 and time t5.

Steering wheel 310 is then operated toward the neutral position at a constant speed from time t5. When steering wheel 310 returns to the neutral position at time t6, steering wheel 310 is then maintained in the neutral position.

In the case of such an operation pattern of steering wheel 310, in other words, such a change in pattern of operation angle θ, variation Δθ is a constant value (constant value≠0) of the sign according to the operation direction between time t1 and time t2, between time t3 and time t4, and between time t5 and time t6, which are the times when operation angle θ changes at a constant speed.

On the other hand, variation Δθ is held at zero before time t1, between time t2 and time t3, between time t4 and time t5, and after time t6, which are the times when operation angle θ is maintained at a predetermined angle.

When variation Δθ is a constant value (constant value≠0) of the sign according to the operation direction, the integral of variation Δθ increases or decreases at a constant speed in the direction according to the sign of variation Δθ, and while variation Δθ is zero, the integral is maintained at the value immediately before variation Δθ becomes zero.

Therefore, while operation angle θ is maintained at first predetermined angle θ1 or second predetermined angle θ2, the integral of variation Δθ is maintained at a predetermined value of the sign according to the operation direction of steering wheel 310.

As a result, the direction of torque for returning steering wheel 310 to the neutral position is determined from the sign of the integral of variation Δθ.

Therefore, by multiplying the integral of variation Δθ by the gain to determine the amount of reference hysteresis torque Tshb, the amount of reference hysteresis torque Tshb becomes a steering reaction force torque component for returning steering wheel 310 to the neutral position.

While operation angle θ is maintained at first predetermined angle θ1 or second predetermined angle θ2, in other words, when steering wheel 310 is retained in a given steering position, the amount of hysteresis torque Tsh is maintained in a constant amount of torque of the sign according to the operation direction of steering wheel 310.

That is, when steering wheel 310 is operated from the neutral position and steering is retained at a predetermined operation angle θ(>0), the amount of hysteresis torque Tsh is the same direction of torque as before steering is retained, and maintains the amount of torque when steering wheel 310 has reached the predetermined operation angle θ.

Therefore, when the driver retains steering while steering wheel 310 is in a turned state, the driver needs operation torque that resists the steering reaction force including the amount of hysteresis torque Tsh, and this prevents steering wheel 310 from wobbling and becoming unstable as steering is retained.

In this manner, even if the steering is retained as it stands, the direction of torque that applies the amount of hysteresis torque Tsh is decided, and by giving the amount of hysteresis torque Tsh, the steering is stabilized and the driver's sensation of steering is improved.

Furthermore, in a state in which the amount of hysteresis torque Tsh is restricted by upper limit value Tsh_MAX, for example, from time t2 to time t3 in FIG. 8, the amount of hysteresis torque Tsh is held at upper limit value Tsh_MAX, even if operation angle θ fluctuates at the region in which the amount of hysteresis torque Tsh before restriction exceeds upper limit value Tsh_MAX.

Thus, changes in the amount of hysteresis torque Tsh in association with the fluctuations in operation angle θ may prevent the hunting of operation angle θ of steering wheel 310 in the steering retaining state.

Furthermore, when the steering of steering wheel 310 is retained in a region in which the absolute value of the amount of hysteresis torque Tsh is set to be less than upper limit value Tsh_MAX, the amount of damping torque Tshd is applied in a direction that prevents changing of operation angle θ, and thus, the hunting of operation angle θ of steering wheel 310 is prevented.

The gain when the amount of reference hysteresis torque Tshb is determined from the integral of variation Δθ may be variably set by integration unit 532 in accordance with vehicle speed V, that is, the amount of hysteresis torque Tsh may be variably set in accordance with vehicle speed V.

Figure 9:
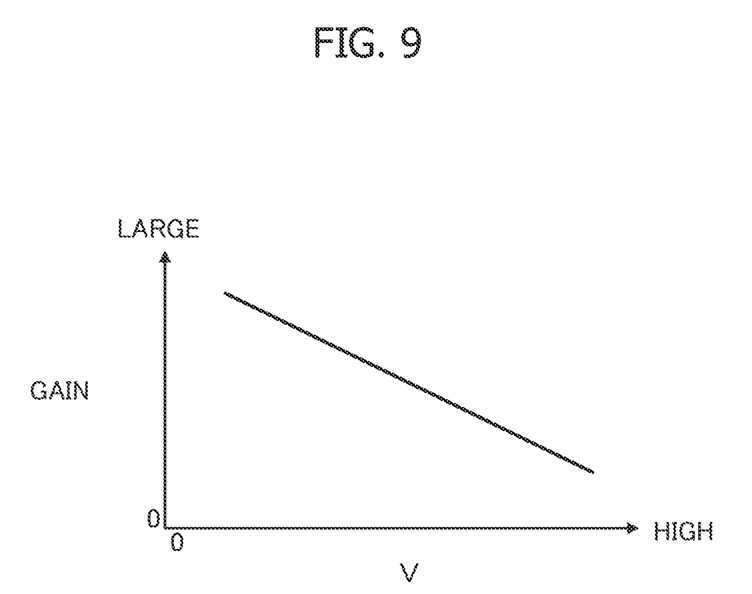
FIG. 9 is a line graph showing a correlation between the gain in the amount of hysteresis torque Tsh and vehicle speed V.

FIG. 9 is a line graph showing an example of the correlation between the gain in the amount of reference hysteresis torque Tshb and vehicle speed V, in which the vertical axis shows the gain in the amount of reference hysteresis torque Tshb, and the horizontal axis shows vehicle speed V.

Integration unit 532 increases the gain as vehicle speed V decreases, and uses the gain to determine the amount of reference hysteresis torque Tshb from the integral of variation Δθ.

As a result, fluctuations in the frictional torque due to vehicle speed V may be simulated, and sensations of steering closer to those of a steering system, in which steering wheel 310 and steering device 400 are mechanically connected to each other, may be realized.

Furthermore, although the above-described hysteresis torque calculation unit 530 determines the amount of torque and direction of torque of the amount of hysteresis torque Tsh from the operation history of steering wheel 310 based on the change in operation angle θ of steering wheel 310 that is detected by operation angle sensor 340, the amount of torque and direction of torque may be determined from operation information other than operation angle θ.

For example, rotational position RA of motor 330A detected by motor rotation angle sensor 330B may be used as the operation information of steering wheel 310 by hysteresis torque calculation unit 530.

Here, rotational position RA of motor 330A is changed in accordance with operation angle θ of steering wheel 310, and variation ΔRA determined from the present value and the previous value of rotational position RA is proportional to variation Δθ of operation angle θ.

Thus, from variation ΔRA, hysteresis torque calculation unit 530 may determine the amount of torque according to the displacement of steering wheel 310 and the direction of torque for returning steering wheel 310 to the neutral position.

Specifically, operation deviation calculation unit 531 may compare the present value with the previous value of the signal of rotational position RA to determine variation ΔRA, integration unit 532 may determine the amount of reference hysteresis torque Tshb from the integral of variation ΔRA that starts from the neutral position, and damping unit 533 may calculate the amount of damping torque Tshd based on variation ΔRA.

Furthermore, operation torque OT of steering wheel 310 detected by operation torque sensor 350 may be used as the operation information of steering wheel 310 by hysteresis torque calculation unit 530.

Here, operation torque OT is increased when steering wheel 310 departs from the neutral position, and is conversely decreased when steering wheel 310 returns to the neutral position. Variation ΔOT determined from the present value and previous value of operation torque OT indicates the direction of change and degree of change in operation angle θ.

Thus, from variation ΔOT, hysteresis torque calculation unit 530 may determine the amount of torque according to the displacement of steering wheel 310 and the direction of torque for returning steering wheel 310 to the neutral position.

Specifically, operation deviation calculation unit 531 may compare the present value with the previous value of the signal of operation torque OT to determine variation ΔOT, integration unit 532 may determine the amount of reference hysteresis torque Tshb from the integral of variation ΔOT that starts from the neutral position, and damping unit 533 may calculate the amount of damping torque Tshd based on variation ΔOT.

Furthermore, hysteresis torque calculation unit 530 may be provided with a dead zone, in which the amount of hysteresis torque Tsh changes in response after the absolute value of variation in the operation information, specifically, the absolute value of variation in any of operation angle θ, rotational position RA of motor 330A, or operation torque OT, becomes greater than a predetermined value.

When the steering of steering wheel 310 is retained while vehicle 100 is not running, that is, when vehicle speed V is zero, hysteresis torque calculation unit 530 may widen the dead zone as compared to other cases, and when the operation information changes within the dead zone, may maintain the amount of torque and direction of torque of hysteresis torque.

While vehicle 100 is not running, there is less need to sensitively change the steering reaction force torque with respect to the operation of steering wheel 310 as compared to while the vehicle is running, and increasing the dead zone may effectively inhibit the hunting of steering wheel 310 when steering is retained as the vehicle is not running.

The technical ideas described in the above embodiment may be used in any appropriate combination as long as they do not conflict with each other.

Although the present invention is specifically described above with reference to a preferred embodiment, it is apparent to one skilled in the art that variations of the embodiment can be made based on the basic technical concept and the teachings of the present invention.

For example, the steer-by-wire may include a backup mechanism in which steering wheel 301 and road wheels 101, 102 are mechanically coupled to each other via a clutch or the like.

Furthermore, reaction force actuator 330 is not limited to motor 330A, and steering input device 300 may for example include solenoids as reaction force actuator 330.

REFERENCE SYMBOL LIST

100 Vehicle
101-104 Road wheels (tires)
200 Steering system
300 Steering input device
310 Steering wheel (Steering operation input member)
330 Reaction force actuator
340 Operation angle sensor (Operating position detector, Operation information detector)
400 Steering device
500 Control device (Steering reaction force control device)
510 Microcomputer (Control unit)

The invention claimed is:

1. A steering reaction force control device provided in a vehicle that has a steering operation input member mounted in the vehicle and a reaction force actuator that imparts a steering reaction force to the steering operation input member,
the steering reaction force control device comprising a control unit that outputs a control signal to the reaction force actuator,
wherein the control unit:
acquires a physical quantity related to a vehicle speed of the vehicle,
acquires a physical quantity related to operation information of the steering operation input member,
determines an amount of torque of the steering reaction force imparted by the reaction force actuator from the physical quantity related to the vehicle speed of the vehicle and the physical quantity related to the operation information of the steering operation input member,
acquires a present value of the physical quantity related to the operation information of the steering operation input member and a previous value earlier than the present value by a predetermined time, compares the previous value with the present value to determine a change in the operation information, and determines a direction of torque for returning the steering operation input member to a neutral position from an operation history of the steering operation input member based on the change in the operation information, and
outputs a control signal based on the amount of torque and the direction of torque to the reaction force actuator.

2. The steering reaction force control device according to claim 1,
wherein in the control unit, the physical quantity related to the operation information of the steering operation input member is information on an operating position of the steering operation input member detected by an operating position detector that is provided on the steering operation input member.

3. The steering reaction force control device according to claim 1, wherein in the control unit, the physical quantity related to the operation information of the steering operation input member is information on operation torque of the steering operation input member detected by an operation torque detector that is provided on the steering operation input member.

4. The steering reaction force control device according to claim 1, wherein in the control unit, the physical quantity related to the operation information of the steering operation input member is information on an active position of the reaction force actuator detected by an active position detector that is provided on the reaction force actuator.

5. The steering reaction force control device according to claim 1, wherein when steering of the steering operation input member is retained, the control unit sets the direction of torque to the same direction as before steering of the steering operation input member is retained.

6. The steering reaction force control device according to claim 1, wherein when steering of the steering operation input member is retained as the vehicle is not running, the control unit widens a dead zone of the physical quantity related to the operation information of the steering operation input member as compared to other cases, and when the physical quantity related to the operation information of the steering operation input member changes within the dead zone, the control unit maintains the amount of torque and the direction of torque.

7. The steering reaction force control device according to claim 1,
wherein the amount of torque includes an amount of hysteresis torque for returning the steering operation input member to a neutral position, and
wherein the control unit restricts the amount of hysteresis torque so as not to exceed an upper limit value.

8. The steering reaction force control device according to claim 7, wherein the amount of hysteresis torque includes a damping component in which a direction of suppressing a change in the physical quantity related to the operation information of the steering operation input member is a direction of torque.

9. The steering reaction force control device according to claim 7, wherein the control unit variably sets the amount of hysteresis torque in accordance with the vehicle speed of the vehicle.

10. A steering reaction force control method executed by a control unit for controlling a reaction force actuator that imparts a steering reaction force to a steering operation input member mounted in a vehicle, the method comprising:
- acquiring a physical quantity related to a vehicle speed of the vehicle;
- acquiring a physical quantity related to operation information of the steering operation input member;
- determining an amount of torque of the steering reaction force imparted by the reaction force actuator from the physical quantity related to the vehicle speed of the vehicle and the physical quantity related to the operation information of the steering operation input member,
- acquiring a present value of the physical quantity related to the operation information of the steering operation input member and a previous value earlier than the present value by a predetermined time, comparing the previous value with the present value to determine a change in the operation information, and determining a direction of torque for returning the steering operation input member to a neutral position from an operation history of the steering operation input member based on the change in the operation information, and
- outputting a control signal based on the amount of torque and the direction of torque to the reaction force actuator.

11. A steering reaction force control system comprising:
- a steering operation input member mounted in a vehicle;
- a reaction force actuator that imparts a steering reaction force to the steering operation input member;
- a vehicle speed detector that detects a physical quantity related to a vehicle speed of the vehicle;
- an operation information detector that detects a physical quantity related to operation information of the steering operation input member; and
- a control device including a control unit that outputs a control signal to the reaction force actuator, wherein the control unit:
- acquires the physical quantity related to the vehicle speed of the vehicle from the vehicle speed detector;
- acquires the physical quantity related to the operation information of the steering operation input member from the operation information detector;
- determines an amount of torque of the steering reaction force imparted by the reaction force actuator from the physical quantity related to the vehicle speed of the vehicle and the physical quantity related to the operation information of the steering operation input member,
- acquires a present value of the physical quantity related to the operation information of the steering operation input member and a previous value earlier than the present value by a predetermined time, compares the previous value with the present value to determine a change in the operation information, and determines a direction of torque for returning the steering operation input member to a neutral position from an operation history of the steering operation input member based on the change in the operation information, and
- outputs a control signal based on the amount of torque and the direction of torque to the reaction force actuator.

* * * * *